Oct. 14, 1958 — G. F. DALEY ET AL — 2,856,174
CONTINUOUS, CIRCULATING ATMOSPHERE GLASS FURNACE
Filed Dec. 14, 1953

INVENTOR.
George F. Daley
BY Harvey C. Weller
Charles S. Haughey
atty.

INVENTOR.
George F. Daley
BY Harvey C. Weller
Charles S. Haughey
atty

United States Patent Office 2,856,174
Patented Oct. 14, 1958

2,856,174

CONTINUOUS, CIRCULATING ATMOSPHERE GLASS FURNACE

George F. Daley and Harvey C. Weller, Toledo, Ohio, assignors to Surface Combustion Corporation, Toledo, Ohio, a corporation of Ohio Application December 14, 1953, Serial No. 397,991

3 Claims. (Cl. 263—19)

This invention relates to heating in circulating atmosphere furnaces, and more particularly to heating in glass lehrs of special shapes such as television tubes which require a carefully controlled temperature and rate of heating.

A particular problem in television tube manufacture is the heating of the tube for any of several purposes, such as annealing of the tube or for evacuating and sealing the tube, and applying different heating rates to portions of the tube of different glass thickness without locally overheating the tube or bringing it to non-uniform final temperature.

In the solution of this heating problem primary and secondary recirculating air streams are provided in the lehr and directed over the tube in individual paths so that the primary air stream may preferentially heat thicker portions of the glass. Heat is preferentially applied to the primary stream to increase the rate of heating of the thicker portions of glass while maintaining substantial temperature uniformity in the tube, and the primary and secondary air streams are intermixed to supply heat to the secondary stream and maintain nominal lehr temperature.

For a consideration of what we believe to be novel and our invention, attention is directed to the following portion of the specification and the drawing and claims thereof.

Figure 1:
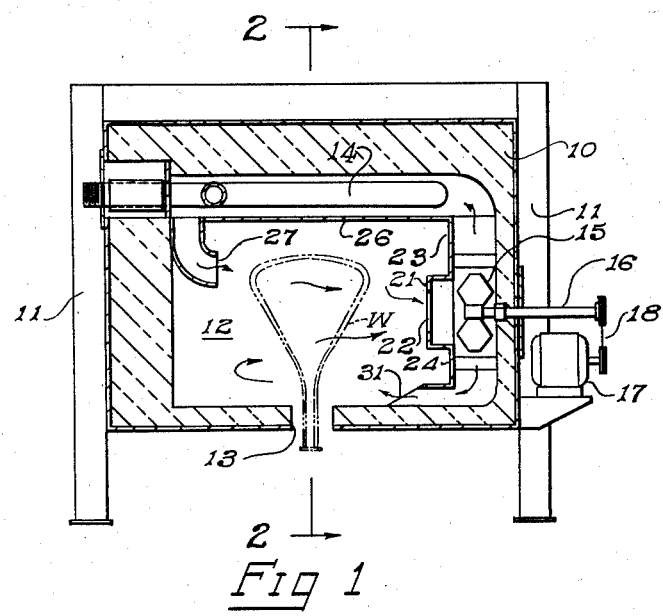
Fig. 1 is a vertical, transverse sectional view of an illustrative lehr.
Figure 2:
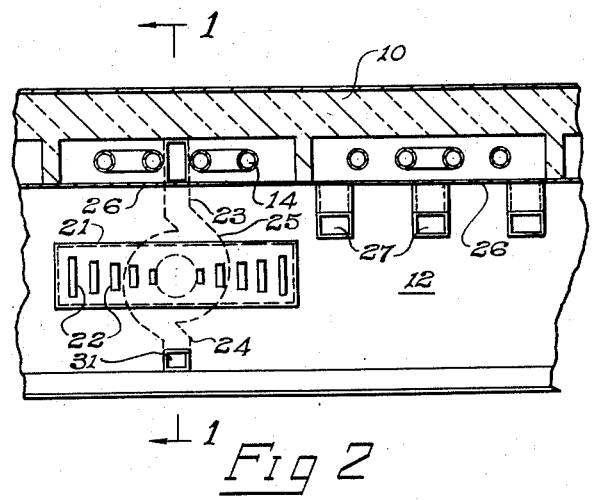
Fig. 2 is a vertical, longitudinal sectional view of the lehr.

The lehr shown in Figs. 1 and 2 comprises refractory insulated walls 10 supported on buckstays 11 and forming a heating chamber 12 through which work may be continuously advanced. When television tubes W are being heated, the tubes are carried big end up with the stem extending through a slot 13 in the bottom wall where it may be supported on conveying mechanism. Such tubes customarily are thinnest about the stems and adjacent cone portions, are thickest at the edge of the top face and the top of the cone portion, and are of intermediate thickness across the top face which is to be the viewing face.

Heat is supplied to the lehr by internally fired W shaped tubes 14 from fuel burners, not shown, which are controlled responsive to temperature in the lehr. Lehr atmosphere, which may be atmospheric air, is recirculated in the lehr and over the tubes 14 to deliver at least a portion of the heat from the tubes 14 to the television tubes W. The atmospheric air is recirculated by a fan mechanism comprising an impeller 15 on a shaft 16 driven by a motor 17 through belts 18. The impeller 15 is recessed in the sidewall 10 of the lehr behind an intake manifold 21 extending longitudinally of the furnace and having slots or openings 22 therein. The slots present more area at the remote ends of the manifold than adjacent the impeller so that the varying pressures imposed on the manifold will cause substantially uniform volumes of air to enter the substantially equally spaced slots 22. The recess about the impeller 15 is in the form of a dual, opposed outlet scroll 25, so that the air moved by the impeller is divided into two streams, one moving up through duct 23 and the other moving down through duct 24.

The upper air stream delivers from duct 23 into a heating tube compartment formed by a metal roof sheet 26 and the wall 10, and passes along the heating tube 14 towards outlets 27 which direct this air stream towards the thicker edge portion of the television tube W. This air stream is called a primary circuit, completed as the stream finds its way back to the intake manifold 21.

A secondary circuit of recirculating air is formed by the air stream leaving the duct 24 through an outlet 31 which is directed across the lower portion of the tube and travels in a loop back to the inlet manifold 21. The primary and secondary circuits converge in the inlet manifold, are thoroughly mixed, and delivered through ducts 23 and 24, at equal temperatures. Thus the lehr is primarily heated through the primary circuit, and the secondary air circuit is supplied with heat primarily by mixing with the primary circuit.

Since the top of the television tube W is thicker than the stem end, it requires more heating to bring it to temperature at the same rate. In addition to the added heating capacity of the primary circuit due to passing it over a source of heat, the heating tube 14, the top of the television tube W is also heated by radiation from the tube 14 through the sheet 26 which re-radiates heat downward to the tube W. By proper proportioning of the sizes of the outlets 27 and 31 and by proper adjustment of the volume of air recirculated in the primary circuit, a desired balance between heat re-radiated from the tubes W by the roof sheet 26 and heat transferred to the work by convection is obtained. By controlling the heating tubes responsive to furnace temperature (tube temperature, circulating atmosphere temperature or inside wall temperature) both convection and radiation heating is properly controlled to bring the tube to the desired temperature. Thus where rapid heating of a portion of a workpiece is desired, but overheating must be carefully avoided, the foregoing apparatus provides an answer.

Figure 3:
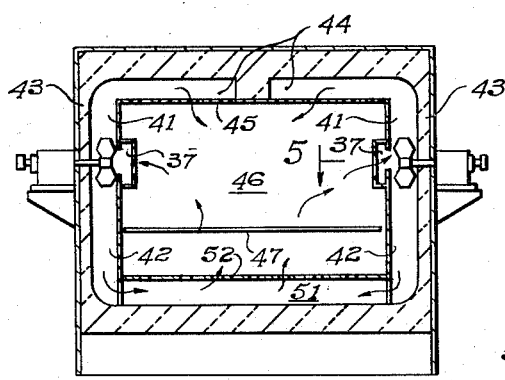
Fig. 3 is a vertical, transverse sectional view of an alternate lehr.
Figure 5:
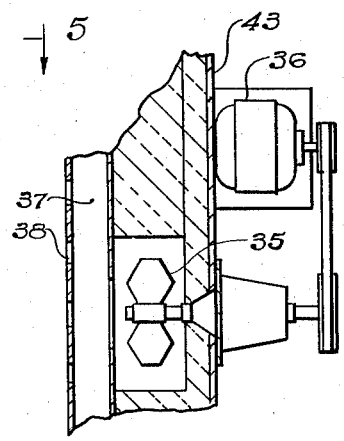
Fig. 5 is a partially sectioned plan view of a fan shown in Figs. 3 and 4.
Figure 4:
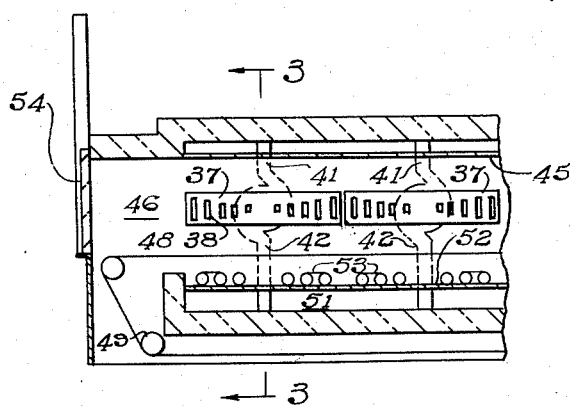
Fig. 4 is a vertical, longitudinal sectional view of the alternate lehr.

An alternate construction utilizing the same principles is shown in Figs. 3, 4 and 5 where impellers 35 driven by motors 36 draw air through inlet manifolds 37 by way of inlet slots 38, and deliver separate streams through upper and lower ducts 41 and 42 in side walls 43. Ducts 41 discharge to overhead plenums 44 formed above a perforated roof plate 45 through which the air stream discharges downward into the lehr chamber 46. Work such as television tubes is carried through the lehr chamber 46 on an endless foraminous belt 47 supported on rolls 48, 49, and such television tubes may be carried with their stems upwards to provide the desired control over relative heating rates thereof. The air stream from the perforated roof plate 45 returns to the intake manifolds 37, completing the secondary circuits, it being noted that in this example two such circuits are maintained across a furnace by opposed impellers. A primary circuit is formed by air passing from lower ducts 42 through lower plenums 51 below perforated floor plates 52, through the plates 52 and across internally fired S shaped heating tubes 53 (having two return bends) and through the belt 47, over the work thereon and thence to the inlet manifolds 37. A door 54 is provided for opening and closing the charge opening for loading the belt 47.

The foregoing apparatus is well suited to relatively rapid heating of glass articles of varying section thickness, especially in the temperature ranges of about 750° F. to 1200° F. commonly used in heating glass, where radiation is relatively ineffective. Heating time is thus much reduced from that resulting from attempts to heat to the desired temperature substantially entirely by radiation, and is also reduced from that resulting from ordinary convection heating where relatively no differential control of convection heating rates is attained.

We claim:

1. In a continuous, circulating atmosphere furnace, in combination: wall means comprising bottom, top and side walls forming a heating chamber for advancing work therethrough to be heated; conveyor means for conveying work axially through the chamber; a dual outlet impeller casing on one of said side walls having a central opening therein for receiving atmosphere from the chamber in the region of the path of work passing therethrough; a first duct in receiving connection with an outlet from said casing and adapted to deliver a first stream of atmosphere therefrom from adjacent the bottom wall upwardly toward the work on the conveyor means; a second duct in receiving connection with the other outlet from said casing and adapted to deliver a second stream of atmosphere therefrom from adjacent the top wall downwardly toward the work on the conveyor means; and heating means extending along and adjacent one only of said bottom and top walls for heating one only of said streams and for radiating heat to the work from adjacent said one bottom or top.

2. In a continuous circulating atmosphere furnace, in combination: wall means comprising bottom, top and side walls forming a heating chamber for advancing work therethrough to be heated; belt conveyor means for conveying work through said heating chamber; a dual outlet impeller casing on one of said side walls, having a central opening therein for receiving atmosphere from the chamber in the region of the path of work passing therethrough; a first duct in receiving connection with an outlet of said casing and having a perforated roof plate for discharging the first stream downwardly toward the work on said conveyor means; a second duct in receiving connection with a second outlet of said casing and having a perforated bottom plate for discharging the second stream upwardly toward the work on said conveyor means; and heating means comprising an internally fired heating tube disposed laterally across the chamber adjacent one of said perforated plates for heating one of said streams and for radiating heat to the work.

3. In a continuous, circulating atmosphere furnace, in combination: wall means comprising bottom, top and side walls forming a heating chamber for advancing work therethrough to be heated; conveyor means for conveying work axially through the chamber; a dual duct outlet impeller casing on one of said side walls having a central opening therein for receiving atmosphere from the chamber in the region of the path of work passing therethrough; a first duct in receiving connection with an outlet from said casing and adapted to deliver a first stream of atmosphere therefrom from adjacent the bottom wall toward the bottom of the work on the conveyor means; a second duct in receiving connection with the other outlet from said casing and adapted to deliver a second stream of atmosphere therefrom from adjacent the top wall toward the top of the work on the conveyor means; and heating means extending along and adjacent one only of said bottom and top walls for heating one only of said streams and for radiating heat to the work from adjacent said one bottom or top wall.

References Cited in the file of this patent

UNITED STATES PATENTS

| | | |
|---|---|---|
| 1,729,675 | Lecocq | Oct. 1, 1929 |
| 1,784,727 | Harris | Dec. 9, 1930 |
| 1,853,424 | Harris | Apr. 12, 1932 |
| 2,039,429 | Lydon | May 5, 1936 |
| 2,050,180 | Hurxthal | Aug. 4, 1936 |
| 2,669,788 | Drum et al. | Feb. 23, 1954 |
| 2,674,811 | Thornburg | Apr. 13, 1954 |

UNITED STATES PATENT OFFICE
CERTIFICATE OF CORRECTION

Patent No. 2,856,174                      October 14, 1958

George F. Daley et al.

It is hereby certified that error appears in the printed specification of the above numbered patent requiring correction and that the said Letters Patent should read as corrected below.

Column 3, line 34, after "top" insert -- wall --.

Signed and sealed this 27th day of January 1959.

(SEAL)
Attest:

CARL H. AXLINE
Attesting Officer

ROBERT C. WATSON
Commissioner of Patents